March 25, 1969 J. H. GRIFFITHS ET AL 3,435,231

OPTICAL MEANS FOR FOLLOWING THE RELATIVE MOVEMENT
OF TWO MARKS ON A SPECIMEN DURING TENSILE TESTING

Filed Aug. 10, 1965 Sheet 1 of 2

United States Patent Office 3,435,231
Patented Mar. 25, 1969

3,435,231

OPTICAL MEANS FOR FOLLOWING THE RELATIVE MOVEMENT OF TWO MARKS ON A SPECIMEN DURING TENSILE TESTING

John H. Griffiths, Bledlow, and Barrie K. Poulson, High Wycombe, England, assignors to Instron Limited, High Wycombe, England, a company of Great Britain Filed Aug. 10, 1965, Ser. No. 478,705
Int. Cl. G01j 1/20; G01n 3/28, 21/00
U.S. Cl. 250—201 7 Claims

ABSTRACT OF THE DISCLOSURE

An optical extensometer for use in the tensile testing of a specimen having two marks inscribed thereon and including two optical heads for scanning the surface of the specimen and producing an output signal, servo mechanisms for receiving the signals and locking one of the heads on each of the marks, and searching apparatus for enabling each of the heads to be set opposite one of the marks prior to testing.

This invention relates to optical extensometers.

According to the present invention there is provided an optical extensometer for use in the tensile testing of a specimen having two marks inscribed thereon, the extensometer comprising first and second optical heads for scanning the surface of the specimen and producing an output signal in accordance with the nature of the surface of the specimen, servo mechanisms for receiving said signals and maintaining the heads locked one on each of the two marks, means for comparing movement of one head relative to the other, and searching apparatus in association with each head for enabling the head to be set opposite the appropriate one of said mark prior to tensile testing, each said searching apparatus being arranged to move the associated head over a limited distance and when the head has travelled over said distance to reverse the motion of the head, the searching apparatus including a memory device to the input of which during searching a signal is applied corresponding to the output signal of the head, the memory device serving to store the maximum signal applied thereto whilst the head is moving over said limited distance, which maximum signal occurs when the head is opposite the appropriate one of said marks, the memory device during reverse motion of the head being arranged to compare the signal applied thereto with the stored signal, the apparatus being arranged to stop searching by the head when the signal applied to the memory device during reverse motion of the head corresponds to the stored signal.

For a better understanding of the invention and to show how the same may be carried into effect, reference will now, by way of example, be made to the accompanying drawings, in which.

Figure 2:
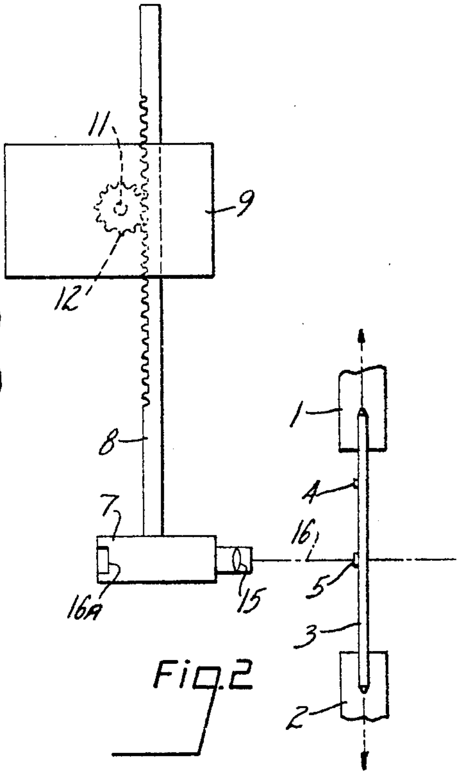
FIGURE 2 is a diagrammatic side view of one of the follower units of the extensometer of FIGURE 1.

The optical extensometer is for use with a tensile testing machine that has jaws 1 and 2 (FIGURE 2) for gripping opposite ends of a test specimen 3. The specimen has upper and lower lines 4 and 5 inscribed thereon as by painting, these lines being a known distance apart. This distance is known as the "gauge length." In operation the testing machine draws the jaws 1 and 2 apart and subjects the specimen 3 to a tensile load so that it is elongated, the marks 4 and 5 moving apart. The extensometer has heads 6 and 7 which, in a manner described below, respectively "lock on" the marks 4 and 5 and follow these marks during tensile testing, displacement of the heads 6 and 7 relative to each other being electrically compared to produce an output signal that is a measure of the displacement of the mark 4 relative to the mark 5, i.e. it is a measure of the elongation of the gauge length of the specimen.

Figure 1:
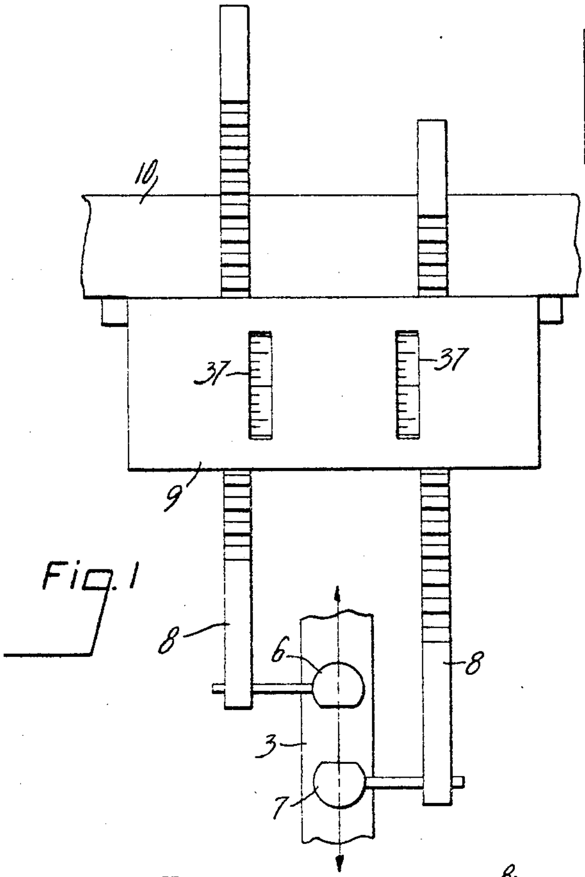
FIGURE 1 is a diagrammatic front elevation of an optical extensometer.

The heads 6 and 7 are each secured to the lower end of an associated rack 8 that is carried by a drive box 9 (FIGURE 1) secured to a crosshead 10 of the testing machine. The heads 6 and 7 are similarly constructed as are the two drives for moving these heads vertically. In the ensuing description therefore only the head 7 and its associated drive is described in detail.

The rack 8 carrying the head 7 is guided by the drive box 9 for vertical movement and a gear 12 mounted on a shaft 11 meshes with the rack 8. A servo motor 13 is arranged for driving the gear 12 through a reduction gear chain 13A. The head 7 is provided with a lens system 15 (FIGURE 2) having a horizontal optical axis 16. A lamp (not shown) carried by the head 7 illuminates an area on the specimen 3 around the axis 16. The lens system 15 forms an image of the illuminated part of the specimen 3 on a vertical image plane 16A. Two photocells (not shown) are disposed at the image plane 16A, the cells being closely adjacent and one above the other. It will be appreciated that if the axis 16 is slightly below the mark 5 the image of this mark will be formed on the lower photocell whereas if the axis 16 is slightly above the mark 5 the image of the mark will fall on the upper photocell. When the axis 16 passes through the mark 5 the image thereof will fall equally on the two cells. The cell outputs are substracted one from the other by a electric circuit (not shown) and the resulting signal is applied by a line 17 (FIGURE 3) to an amplifier 19 the output of which is applied to a switch 18 which in a first position thereof connects the amplifier output to the servo motor 13 and in a second position thereof connects the amplifier output to an auxiliary servo motor 27. Assume that the switch 18 is in said first position. It will be understood that if the axis 16 is above or below the mark 5 a signal of appropriate sign is applied to the line 17 and the output of the amplifier 19 is applied to the motor 13 which through the gear chain 13A, gear 12 and rack 8 (which are omitted from FIGURE 3), drives the head 7 down or up to cause the axis 16 to register with the mark 5. When the axis 16 passes accurately through the centre (measures vertically) of the mark 5 there is zero signal applied to the line 17 so that the motor 13 does not drive the gearwheel 12 and the head 7 remains stationary.

Figure 4:
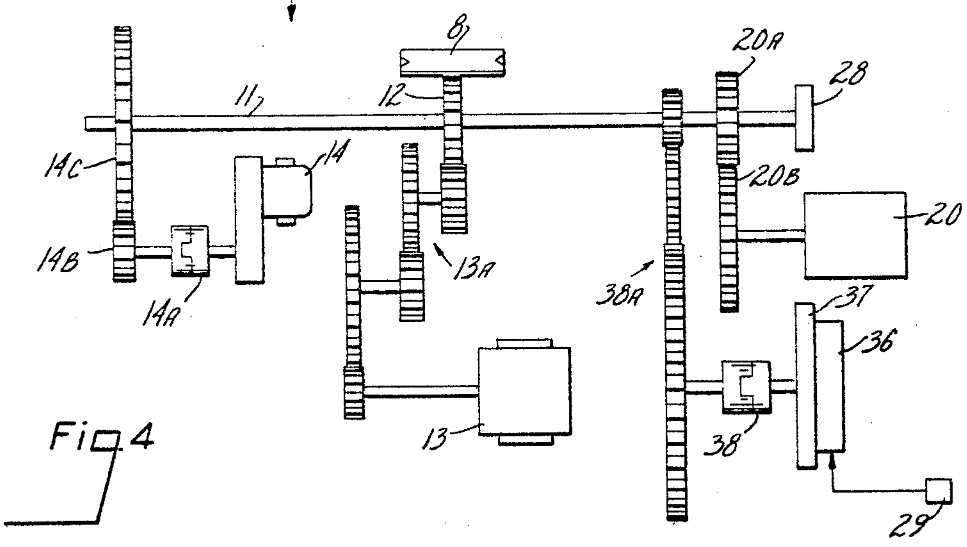
FIGURE 4 is a diagram illustrating the mechanical driving arrangements for the follower unit of FIGURE 2.

The two servo motors 13 respectively associated with the heads 6 and 7 are arranged each to drive via the associated shaft 11 and gears 20A, 20B (FIGURE 4) an associated synchro 20, the two synchros forming part of a differential synchro system that produces an output signal in a line 21 (FIGURE 3) that corresponds to angular movement of the shaft 11 driven by one servo motor 13 relative to angular movement ofthe shaft 11 driven by the other servo motor 13. The output signal in the line 21 is thus in accordance with the movement of one head relative to the other.

Figure 3:
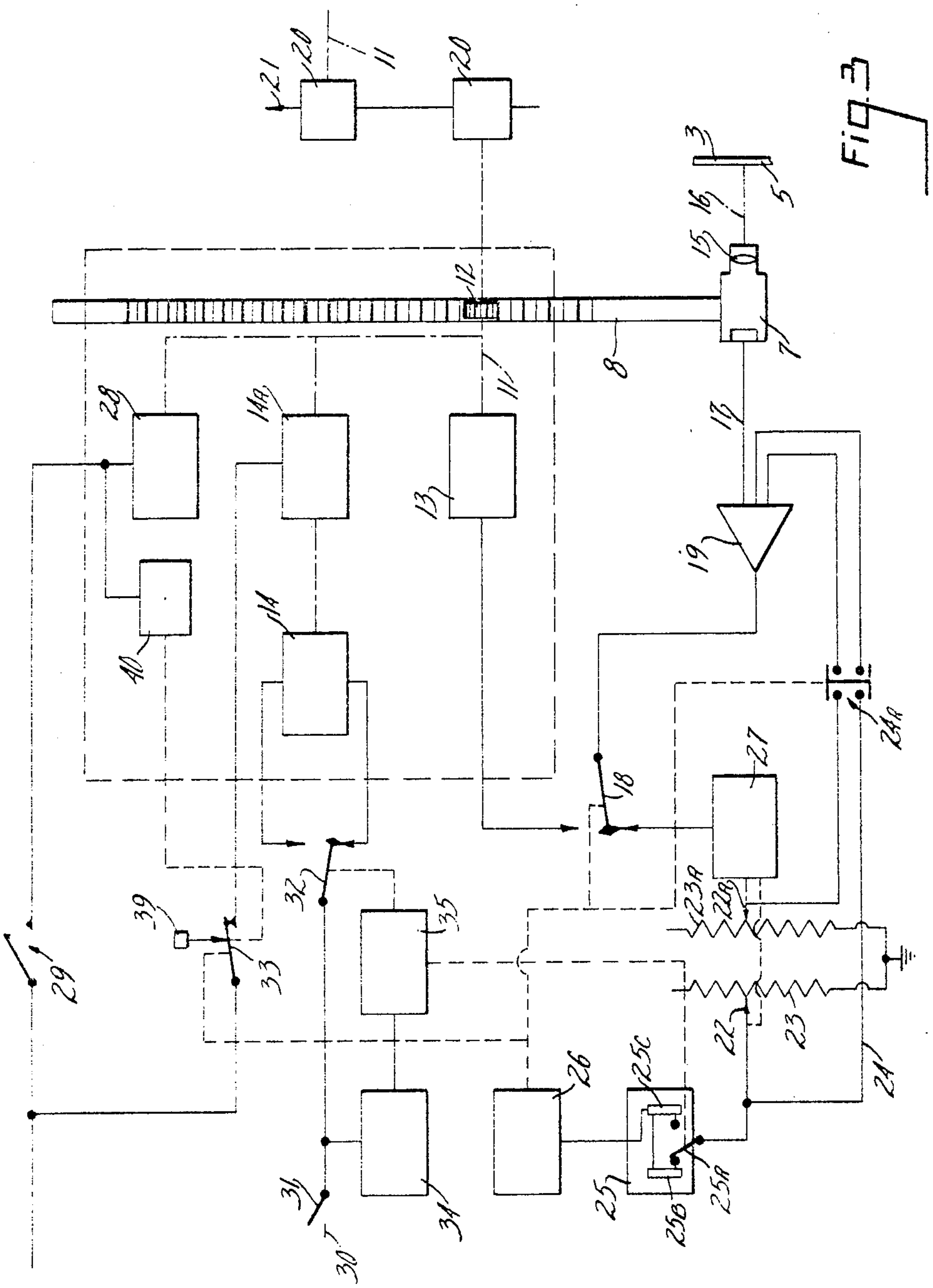
FIGURE 3 is a simplified block circuit diagram of the extensometer of FIGURE 1.

Prior to the tensile test taking place the heads 6 and 7, of course, have to be positioned so that their optical axes 16 pass through the marks 4 and 5. To this end each head employs a searching mechanism. Each searching mechanism causes the associated head, after the latter has been manually positioned approximately at the level of the mark 4 or 5 it is to follow during testing, to be moved vertically over a limited range thereby to search for the mark. During such searching the output from the photocells of the head varies in accordance with changes in surface texture of the specimen and various marks that may be on the specimen and which the head "sees" as it is travelling. However, the greatest response from the head will occur as the axis 16 passes onto and off the mark 5 (or the mark 4 if the head in question is the head 6). The greatest response occurs at positions which are very slightly (say .050 inch) to either side of the position where the axis 16 passes accurately through the centre of the mark and the response from the head is zero. The searching mechanism associated with the head 7 will now be described, it being understood that the searching mechanism associated with the head 6 is similar. A synchronous motor 14 is arranged for driving the shaft 11 through an electromagnetic clutch 14A and gears 14B and 14C. In FIGURE 3 to simplify the layout of the drawing the gears 14B and 14C and gear chain 13A have been omitted. The motor 14 is connected to a current supply line 30 through a main switch 31 and a relay-operated reversing switch 32 having a first position in which the motor 14 is connected for rotating in the direction to cause the rack 8 to move downwardly, and a second position in which the motor 14 is connected for driving the rack 8 upwardly. The electromagnetic clutch 14A is connected to be energised through a switch 33. When the switch 31 is closed in addition to the motor 14 being supplied with current, a timer 34 is started. When the timer times-out, it causes energisation of a relay 35 that changes over the switch 32 from its first to its second position.

As previously indicated, when the switch 18 is in its second position the amplifier 19 has its output connected to the auxiliary servo motor 27. This motor has its output shaft connected to the sliders 22, 22A of potentiometers 23, 23A. When this shaft turns the sliders 22, 22A are moved along the potentiometers 23, 23A such that the potentials on the sliders 22, 22A increase corresponding to rotational displacement of the shaft from an initial position. The potentials on the sliders 22, 22A thus vary in correspondence with that in the line 17. The slider 22 applies via a line 24 and one part of a double switch 24A feedback to an input of the amplifier 19. The amplifier 19 amplifies the difference between the potentials applied thereto by the lines 17 and 24. Thus when the potential on the slider 22 is equal to that on the line 17 and the switch 24A is in the condition connecting the slider 22 to the amplifier 19, the output from the latter is zero and the motor 27 stops driving the sliders 22, 22A. Hence for a given output from the head 7 the motor 27 drives the sliders 22, 22A each to a given position. The slider 22A is connected through the other part of the double switch 24A to another input of the amplifier 19 to control the gain of this amplifier. The switch 24A is such that when the slider 22 is connected to the amplifier 19 the slider 22A is not, and vice versa. The slider 22 is also connected to a memory device 25 which has therein a switch 25A, a capacitance 25B and a comparator 25C. The relay 35 is connected to operate the switch 25A such that when the relay is de-energised the output of the slider 22 is applied to the capacitance 25B and when the relay 35 is energised the potential of the slider 22 is applied to the comparator 25C. The memory device 25 is connected to operate a relay 26 which controls the switches 18, 24A and 33.

When the main switch 31 is manually closed to initiate searching, the switches 18, 25A, 32 and 33 are in the positions shown in FIGURE 3. The clutch 14A is energised the motor 14 drives the rack 8 and hence the head 7 downwardly the timer 34 is started, and the output from the head 7 is applied via the amplifier 19 to the motor 27. The potential on the slider 22 is applied to the capacitance 25B and also to the amplifier 19. It will be understood that the capacitance 25B stores the largest voltage that is applied thereto during downward movement of the head 7 which is the voltage occurring when the axis 16 of the head 7 moves past the mark 5. When the timer 34 times-out and operates the relay 35, the head 7 is at the bottom limit of its travel over said limited range. The relay 35 upon operation thereof changes over the condition of the switch 32 so that the motor 14 reverses and drives the head 7 upwardly. The relay 35 also changes over the condition of the switch 25A so that the potential on the slider 22 is applied to the comparator 25C which compares the signal fed thereto by the slider 22 during upward movement of the head 7 with the voltage stored by the capacitance 25B. When the motor 14 has driven the head 7 upwardly sufficiently for the axis 16 to move onto the mark 5, the signal applied to the comparator circuit 25C is approximately equal to the voltage stored by the capacitor 25B and the comparator 25C causes the memory device 25 to respond to operate the relay 26. The relay 26 opens the switch 33 so that the clutch 14 is disengaged. The motor 14 continues to operate but cannot drive the rack 8 because of disengagement of the clutch 14A. It will be understood that whilst the motor 14 was driving the rack 8, no current was supplied to the servo motor 13 so that its rotor idles to follow the movement of the rack 8. When the clutch 14A is disengaged the head 7 is opposite the mark 5. At the same time as the relay 26 operates to open the switch 33, it also changes over the switch 18 from its second to its first condition whereby the servo mechanism associated with the head 7 is switched on and the axis 16 becomes accurately aligned with the centre of the mark 5. In addition the operation of the relay 26 actuates the switch 24A to connect the slider 22A to the amplifier 19 instead of the slider 22.

In practice the relay 26 is arranged to be operated by the memory device 25 when the potential applied to the comparator circuit 25C by the slider 22 reaches 90% of the voltage stored by the capacitance 25B in the memory device 25.

As previously mentioned, the shaft of the motor 27 turns from an initial position an amount proportional to the output of the head 7. The maximum displacement of the motor shaft occurs when the head 7 becomes opposite the mark 5 which is the position in which the motor 14 stops driving the head 7. The maximum displacement of the output shaft of the motor 27 depends on the size of the mark 5, the level of illumination and the colour contrast of the mark on the specimen 3. Satisfactory operation of the servo mechanism is dependent on these three factors and since they can vary over a fairly wide range feedback is applied to the input of the amplifier 19 from the slider 22A for compensation purposes. The position of the slider 22A is set at the instant the servo mechanism is switched on and it remains in its set position, due to friction and the absence of any return force, during the subsequent tensile test.

An electromagnetic brake 28 is associated with each rack 8 for locking the latter against vertical movement when the brake 28 is energised. Each brake 28 is connected to be supplied through a microswitch 29 controlled by a cam 36 carried by a setting dial 37. Each setting dial 37 is connected to the input of a slipping clutch 38 the output of which is connected through a gear train 38A to the shaft 11. In addition to being operated by the relay 26 the switch 33 is also arranged to be closed by operation of a reset button 39 and to be opened when a relay 40 is energised. The relay 40 is energised when the microswitch 29 closes. At the conclusion of the tensile test, the switch 32 is in its second position so that the motor 14 is running in the direction for driving the associated head 6 or 7 as the case may be upwardly. Upon operating the reset button 39 to close the switch 33 the clutch 14A is engaged so that the associated head 6 or 7 is driven upwardly. The gear train 38A through the clutch 38 turns the cam 36 until the latter operates the associated microswitch 29. The brake 28 then becomes effective to lock the rack 8 against vertical movement and the relay 40 is energised to open the switch 33 and disengage the clutch 14A. The position to which the head is driven upwardly is previously determined by the setting of the dial 37 in relation to the output member of the clutch 38. This is done by manually turning the dial 37 whilst the brake 28 is engaged to lock the gears of the train 38A against movement. The clutch 38 therefore slips during this manual operation of the dial 37.

The extensometer described above is used as follows. The drive box 9 is fixed to the crosshead 10 and a specimen 3 having the marks 4 and 5 thereon is attached to the jaws 1 and 2. The heads 6 and 7 are initially set at a level slightly above the marks 4 and 5 respectively. The switches 31 are then closed to switch on the searching mechanisms. The head 7 moves downwardly over the whole of said limited range, a voltage corresponding to the maximum which occurs when the axis 16 moves over the mark 5 being stored on the capacitance 25A in the memory device 25. The head 7 is then moved upwardly and when the axis 16 again registers with the mark 5 the relay 26 operates, the motor 14 no longer drives the rack 8 and the head 7 remains opposite the mark 5. The head 6 similarly searches for and stops opposite the mark 4. The servo mechanisms associated with the two heads 6 and 7 are switched on and the pen recorder becomes operative for recording purposes. The tensile testing machine is then set in operation and the specimen 3 subjected to tensile load. The servo mechanisms cause the heads 6 and 7 to follow the marks 4 and 5 and the differential synchro system produces in the line 21 an output signal that corresponds to the elongation of the gauge length of the specimen, this being the initial length between the marks 4 and 5.

It will be understood that the output signal of the differential synchro system can be applied to the chart drive system of a pen recorder or to some other indicating system.

What is claimed is:

1. An optical extensometer for use in the tensile testing of a specimen having two marks inscribed thereon, said extensometer comprising first and second optical heads for scanning the surface of said specimen each producing an output signal in accordance with the nature of the surface of said specimen, servo mechanisms for receiving said signals and maintaining said heads locked one on each of said two marks, searching apparatus in association with each of said heads for enabling each of said heads to be set opposite the appropriate one of said marks prior to tensile testing, each said searching apparatus being arranged to move its associated head over a limited distance and when its head has traveled over said distance to reverse the motion of that head, said searching apparatus includes a memory device, said memory device comprising a capacitance, a comparator and a switch, said switch being arranged in a first position to apply a signal corresponding to the output signal of the associated head, to the capacitance whilst said associated head is moving over said limited distance, and in a second position to apply a signal corresponding to said output signal to said comparator during reverse motion of said associated head, said comparator during such reverse motion comparing the signal applied thereto with that stored by the capacitance, each said searching apparatus further including a motor for driving the head during searching, switching means for controlling the direction of rotation of said motor, and means for operating said switch and said switching means when the associated head has traversed said limited distance.

2. An extensometer as claimed in claim 1 including a relay controlling said switch and said switching means and a timer which when it times-out operates said relay the timer being arranged to be set in operation at the same time as said motor becomes effective for driving the head.

3. An extensometer as claimed in claim 1, wherein a servo motor is provided in association with each head, and each said searching apparatus includes a further switch which in a first position thereof connects the output from the head to the servo motor and in a second position thereof connects the output of the head to apply a signal corresponding to the output of the head to the memory device, and a relay for actuating said further switch, and wherein the memory device associated with the head controls said relay for actuating said further switch, the arrangement being such that when during reverse motion of the head the signal applied to the memory device corresponds to the stored signal the memory device operates said relay to change said further switch from its second to its first position.

4. An extensometer as claimed in claim 3 including a switch responsive to the relay associated with the memory device for stopping the first-mentioned motor from driving the head at the same time as said further switch is changed from its second to its first position.

5. An extensometer as claimed in claim 3 including an auxiliary motor associated with said further switch and said memory device, the output shaft of said auxiliary motor driving a slider along a potentiometer, the slider being connected to the input of the switch of the memory device, the arrangement being such that when said further switch is in its second position the shaft of said auxiliary motor turns an amount corresponding to the magnitude of the output signal of the head and moves the slider correspondingly whereby the potential on the slider varies in accordance with the output signal of the head.

6. An extensometer as claimed in claim 5, wherein an amplifier is connected between the output of each head and the associated said further switch, and wherein the slider is connected for applying to the amplifier a potential in opposition to that applied to the amplifier by the head, the arrangement being such that said auxiliary motor drives the slider to a given position for a given output signal from the head.

7. An extensometer as claimed in claim 6, wherein when said further switch is in its first position the gain of the amplifier is determined by the position of said slider along said potentiometer.

References Cited

UNITED STATES PATENTS 3,043,184 7/1962 Fitzgerald et al. ------ 250—235

ROBERT SEGAL, *Primary Examiner.*

E. R. LA ROCHE, *Assistant Examiner.*

U.S. Cl. X.R.

250—203; 88—14; 73—95